United States Patent [19]

Berggren

[11] 4,240,308
[45] Dec. 23, 1980

[54] COMBINED PEDAL MECHANISM FOR COMBINED ACCELERATOR AND BRAKE PEDAL FOR MOTOR-CARS

[76] Inventor: Gösta E. Berggren, Hjälmhultsgatan 16 B, S-252 41 Helsingborg, Sweden

[21] Appl. No.: 767,470

[22] Filed: Feb. 10, 1977

Related U.S. Application Data

[63] Continuation-in-part of Ser. No. 517,667, Oct. 24, 1974.

[51] Int. Cl.³ .............................................. G05G 1/14
[52] U.S. Cl. ...................................................... 74/512
[58] Field of Search ......................... 74/512, 571, 578

[56] References Cited

U.S. PATENT DOCUMENTS

| | | | |
|---|---|---|---|
| 2,919,773 | 1/1960 | Fong | 74/512 X |
| 3,704,633 | 12/1972 | Iverson | 287/DIG. 5 X |
| 3,916,719 | 11/1975 | Zwerenz | 74/512 X |
| 3,975,972 | 8/1976 | Muhleck | 74/512 X |

FOREIGN PATENT DOCUMENTS

| | | | |
|---|---|---|---|
| 1104115 | 11/1955 | France | 74/512 |
| 570952 | 12/1957 | Italy | 287/DIG. 5 |
| 445415 | 4/1936 | United Kingdom | 74/512 |

*Primary Examiner*—Samuel Scott
*Assistant Examiner*—Wesley S. Ratliff, Jr.
*Attorney, Agent, or Firm*—Neil F. Markva

[57] ABSTRACT

A pedal assembly is used for simultaneously controlling the brake system and fuel supply for a power driven vehicle. The assembly comprises a single pedal having two arm portions. A first arm portion is effective to move in various working positions within a first plane of operation. A second arm portion is effective to move to various brake working positions and a second plane of operation that is normal to said first plane. The first arm portion is connected to the fuel supply for said vehicle to control said supply while at a working position of said arm portion in said first plane of operation. The second arm portion is connected to the brake system to effect braking while at a brake working position of said second arm in said second plane of operation. The first and second arm portions are connected with respect to each other to effect braking movement of said second arm portion at any working position of said first arm portion.

7 Claims, 8 Drawing Figures

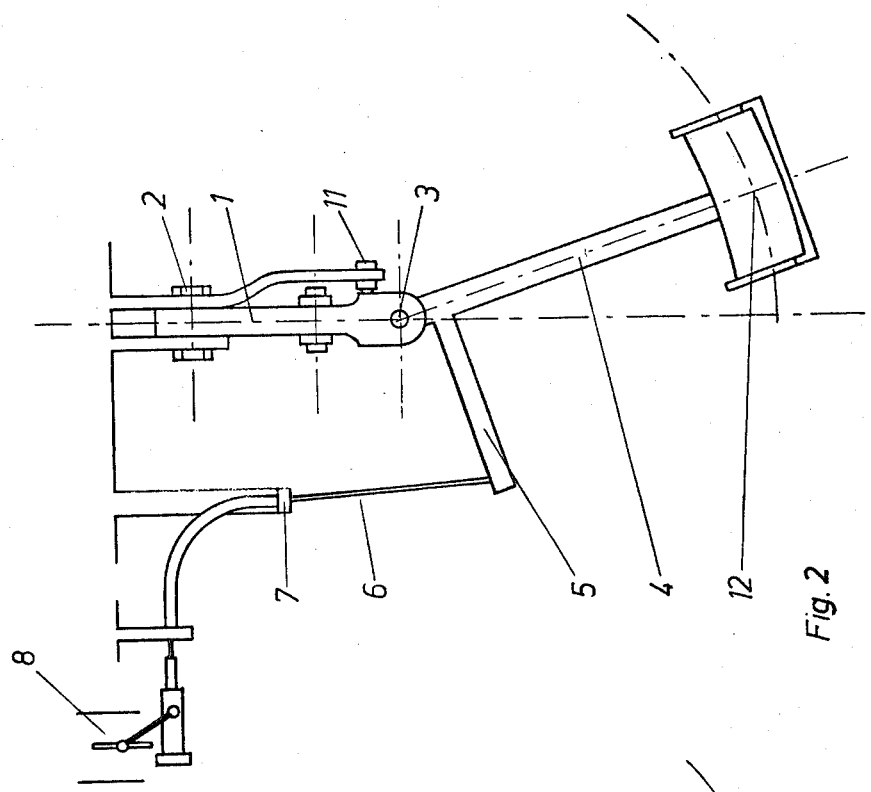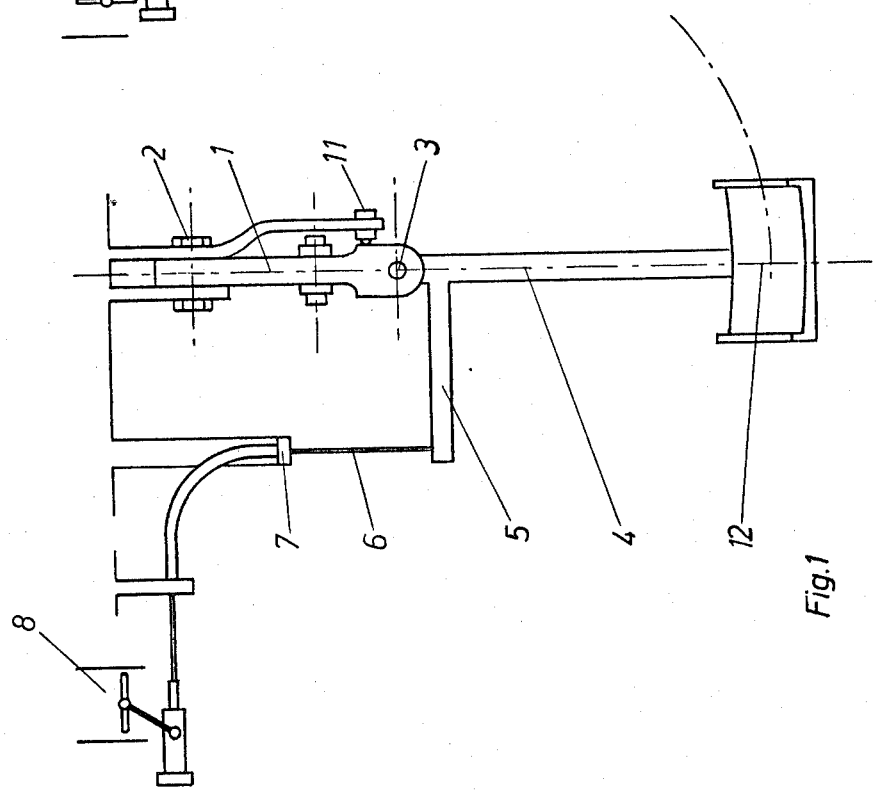

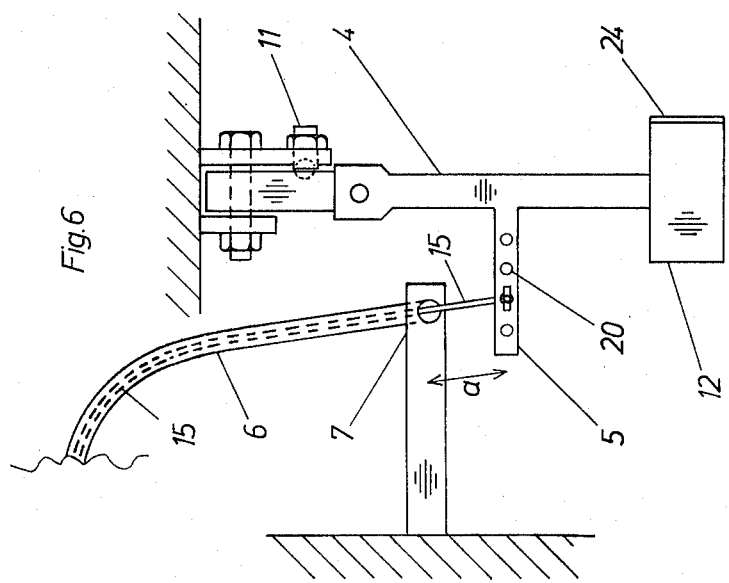
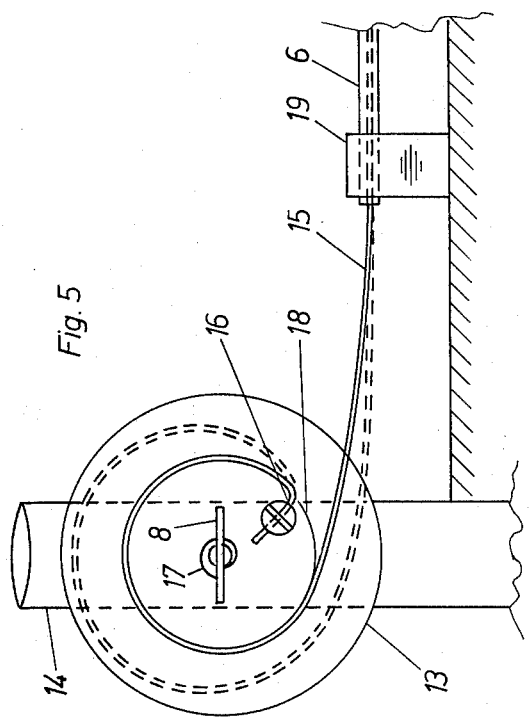

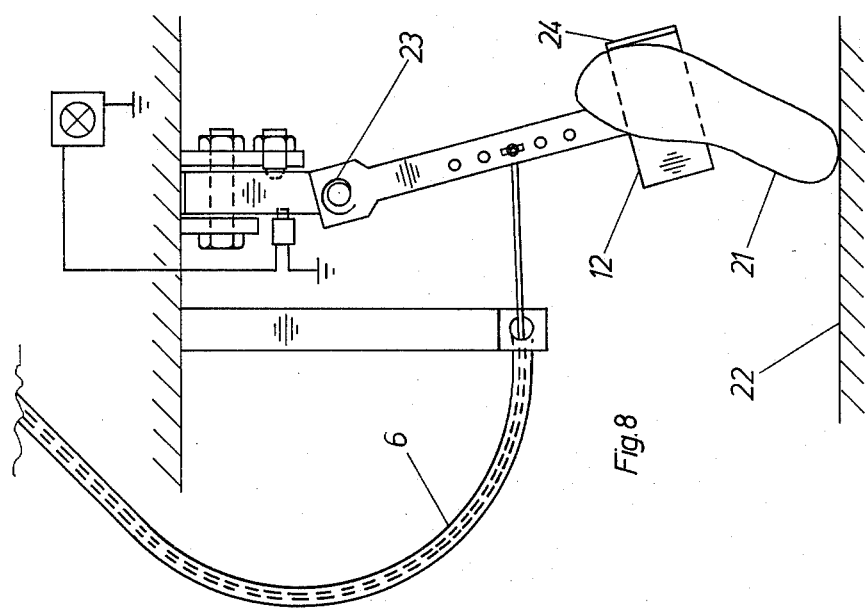
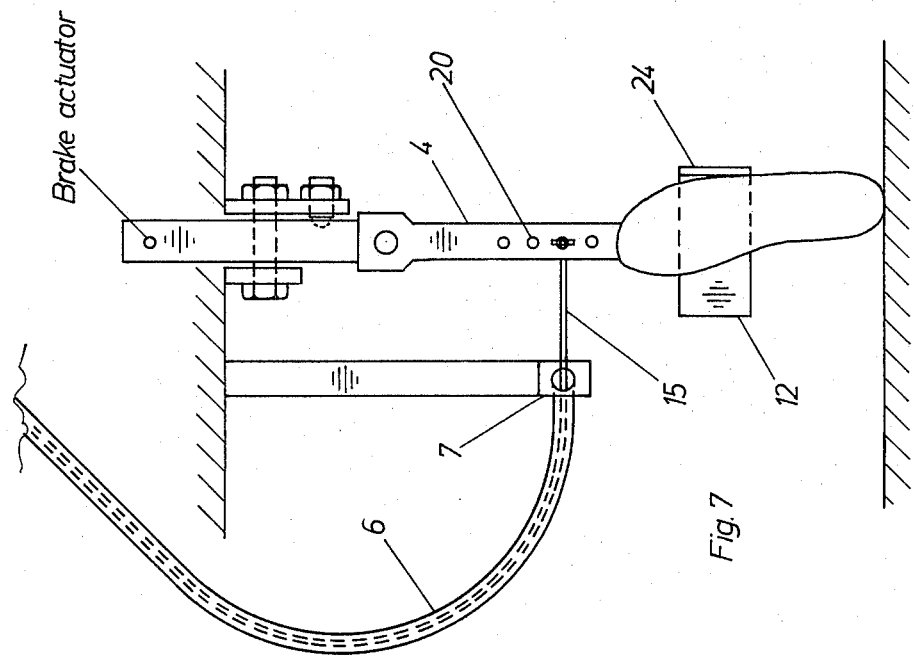

COMBINED PEDAL MECHANISM FOR COMBINED ACCELERATOR AND BRAKE PEDAL FOR MOTOR-CARS

This is a continuation-in-part application of copending application Ser. No. 517,667, filed Oct. 24, 1974, for COMBINED PEDAL MECHANISM FOR COMBINED ACCELERATOR AND BRAKE PEDAL FOR MOTOR-CARS.

BACKGROUND OF THE INVENTION

The present invention relates to a combined pedal mechanism constituting an assembly for effecting acceleration and braking for power driven vehicles. The throttle lever and the brake system are controlled by means of a single pedal in order to shorten the braking stretch during certain traffic situations where quick braking is necessary and to promote a calm and easy driving technique.

Traditionally, over the years, the throttle lever and the brake system have been operated by two different pedals. However, with the intensive and dense traffic, this traditional system is deemed unsatisfactory because of long braking stretches which occur as a result of present day traffic patterns. The braking reaction is extremely important when a sudden traffic situation arises. There are different braking stretches at different rates of speed and different roadways and road conditions. Several different types of tires are manufactured for the purpose of obtaining better stopping and braking capabilities on the various types of roadways.

It is commonly believed that nothing can be done with regard to the thinking distance as it is associated with the human factor involved in stopping and braking on various types of roadways. However, this current belief is deemed incorrect. The braking reaction associated with the human factor can be broken down into two phases. The first phase is the sheer reaction ability and the second phase is composed of the activities necessary for bringing the brake system into action. Under prior art conditions, the right foot of the driver has to be moved from one pedal to the other with three changes of direction motions being necessary. This operation extends the braking stretch corresponding to the time required for effecting these actions.

SUMMARY OF THE INVENTION

With the pedal assembly as described herein, it is possible to eliminate the disadvantages associated with the prior art mechanisms under the present requirements for increased road safety. The pedal assembly includes a single pedal used to control both the brake system and the fuel supply to the engine. The pedal is disposed within the system so that braking may occur at any phase of acceleration with minimum reaction steps. Upon braking, the acceleration is automatically decreased through a reduction of fuel supply. Thus, the thinking distance is reduced considerably resulting in a considerably shorter braking stretch for the power driven vehicle.

The single pedal has two arm portions. A first arm portion is effective to move to various working positions in a first plane of operation. The second arm portion is effective to move to various brake working positions in a second phase of operation. The first plane of operation is normal or perpendicular to said second plane of operation. The first arm portion is connected to the fuel supply for the vehicle to control the supply while the first arm portion is at a working position in said first plane of operation. The second arm portion is connected to the brake system to effect braking while the second arm portion is in the second plane of operation. The first and second arm portions are connected with respect to each other to effect braking movement of the second arm portion while the first arm portion is in any working position.

Other features of the invention are directed to the specific use of cable means, pivotal connections between the first and second arm portions, specific means for actuating the brake system and the fuel supply throttle for the vehicle, a blocking device and a specific pedal configuration.

BRIEF DESCRIPTION OF THE DRAWINGS

Other objects of this invention will appear in the following description and appended claims, reference being made to the accompanying drawings forming a part of the specification wherein like reference characters designate corresponding parts in the several views.

FIG. 1 is a front elevational view of an assembly made in accordance with this invention. The pedal is not activated with the brake system in a resting position and the fuel control mechanism in a resting or idling position;

FIG. 2 is a front elevational view of the assembly of FIG. 1 with the pedal being in an acceleration working position;

FIG. 5 is a front elevational view of the means for moving the throttle valve.

FIG. 6 is a front elevational view of the Bowden-cable arrangement at a lever member.

FIG. 7 is a front elevational view of a second Bowden-cable arrangement without lever member.

FIG. 8 is a front elevational view of the pedal assembly cooperating with the driver's foot.

DESCRIPTION OF SPECIFIC EMBODIMENTS

Figure 4:
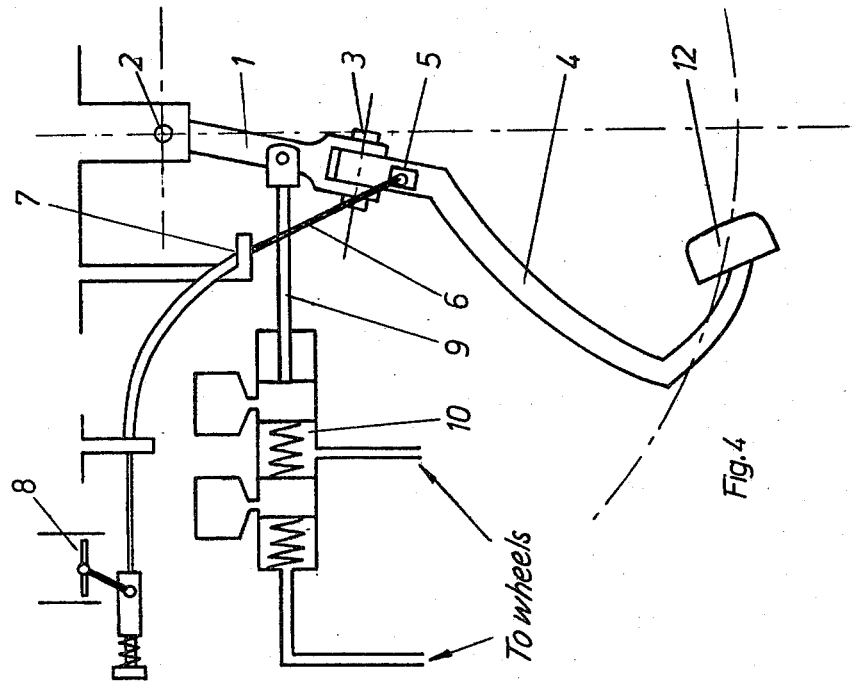
FIG. 4 is a side elevational view of the assembly of FIG. 1 with the position of the pedal when the brake system is put into operation.

More specifically, referring to the drawings, the pedal assembly includes a first arm portion 4 and a second arm portion 1. The second arm portion 1 is pivotally connected to the frame structure of the vehicle at shaft 2. At the other end thereof, the second arm portion 1 is pivotally connected at joint 3 to the first arm portion 4. The pivotal movement of the first arm portion 4 about joint 3 is in a direction that is at a right angle with respect to the pivoting movement of the second arm portion 1 about shaft 2. That is, the first arm portion 4 is effective to move to various working positions in a first plane of operation. The second arm portion 1 is effective to move to various brake working positions in a second plane of operation. The first plane of operation is normal or perpendicular to said second phase of operation.

Pedal arm portion 4 includes a lever member 5 which projects outwardly with respect thereto. A "Bowden" cable 6 is attached at the outer end of the side projecting lever member 5 and actuates the fuel supply throttle 8 in the carburetor. The "Bowden cable" is connected to the fixed attachment 7. Attachment 7 is fixed to the frame structure of the vehicle at a location between the fuel supply throttle 8 and the end connection to the lever member 5.

The second arm portion 1 includes a rod 9 constituting a brake actuating member mounted to activate the brake system when the second arm portion 1 is in a brake working position. One end of the rod 9 is pivotally attached to the upper or second arm portion 1. The other end of rod 9 is connected to the main brake cylinder 10. A well leveled blocking device 11 is disposed adjacent the second arm portion 1 for maintaining the second arm portion 1 in a non-braking position while the first arm portion 4 is effective to move to working positions in the first plane of operation. The blocking device 11 prevents unintentional braking by the weight of a foot but can be loosened when braking is desired. Such a blocking device may be a spring loaded ball. The first pedal arm portion 4 will be fitted with a suitable return spring mechanism (not shown).

A foot plate 12 is disposed at the end of the first arm portion 4 and is covered with rubber with sides or ends bent upwardly. The sides of foot plate 12 are bent upwardly to form a grip to hold the foot at the execution of the various pedal operations.

In operation, when the foot plate 12 is moved to the right, as shown in FIG. 2, acceleration occurs. The lower pedal arm portion 4 pivots about joint 3 and permits only this portion to move in the counterclockwise direction. Corresponding movement of the laterally projecting lever member 5 effects pulling of the "Bowden cable" 6 thereby actuating throttle 8 in the carburetor. Consequently, the engine speed increases.

The control arm of the carburetor is fitted with a tube. The wire end of the "Bowden cable" 6 is equipped with a piston and runs in said tube. The piston is spring loaded and is ended with a stop. At idling position, the length of the wire and the stop are fitted in such a way that the carburetor throttle 8 is immediately activated upon acceleration.

At the same time, that foot plate 12 is in the idling position, the wire can be further pulled in upon braking. Braking is effected by pressing piston rod 9 with the piston into the main brake cylinder. See FIG. 4. Brake fluid is pressed into the brake pipes through the wheel or disc brake cylinders thereby effecting braking.

Braking may be carried out from the acceleration position with the fuel flow automatically being decreased. That is, cable means 6 is effective to reduce the fuel supply upon operation of the second arm portion 1 while it is in a brake working position. When the upper pedal arm portion is pressed inwardly, the pulling length of the "Bowden cable" 6 is decreased through the fixed attachment 7 which is arranged between the fuel control 8 on the one hand and the attachment points on the pedal of the actuating device of the brake system and the fuel control, on the other hand. As shown, the acceleration can be increased as well as decreased upon braking by moving the pedals either right or left, respectively. This characteristic of the system makes it easier to change gears softly and effectively and to start on a sloping roadway.

In FIG. 5 the axis of the throttle valve 8 of the carburetor 14 is provided with a pulley 13 having a rather deep groove 18. The throttle valve 8 is spring loaded against the idling position shown. The inner wire 15 of the Bowden cable is positioned in said groove around essentially the whole periphery of the pulley with its first end attached to the pulley at 16. However, the wire 15 is somewhat resilient and tends to straighten. Thus, if the first arm portion 4 is positioned at idling position (FIG. 6) and the pedal is activated to perform braking, the Bowden wire 15 will assume the position shown by dotted lines in FIG. 5. The wire 15 should not leave the groove 18. Said resiliency of the Bowden wire will act as a spring, which will keep the wire under tension so that the wire adjacent the first arm portion is always stretched. However, this Bowden wire spring action will act in the opposite direction to the spring 17 of the throttle valve and it might become necessary to make this spring 17 stronger.

The Bowden cable comprises a Bowden casing 6 and a Bowden wire 15, the first end of the wire being attached to said pulley 13 and the second end being attached to the first arm portion 4 in one of a plurality of openings 20. Thus, the sensitivity of the angular movement of the first arm portion can be varied by using different openings 20. If the length (a) of the Bowden wire protruding from the second end of the Bowden casing is lengthened, the length of the Bowden wire protruding from the first end of the Bowden casing will be correspondingly shortened. The Bowden casing 6 is attached to the vehicle frame at both ends at 7 and 19 FIG. 7 shows a pedal assembly lacking the lever member 5 and wherein the brake actuator is positioned above the horizontal second axis.

Figure 3:
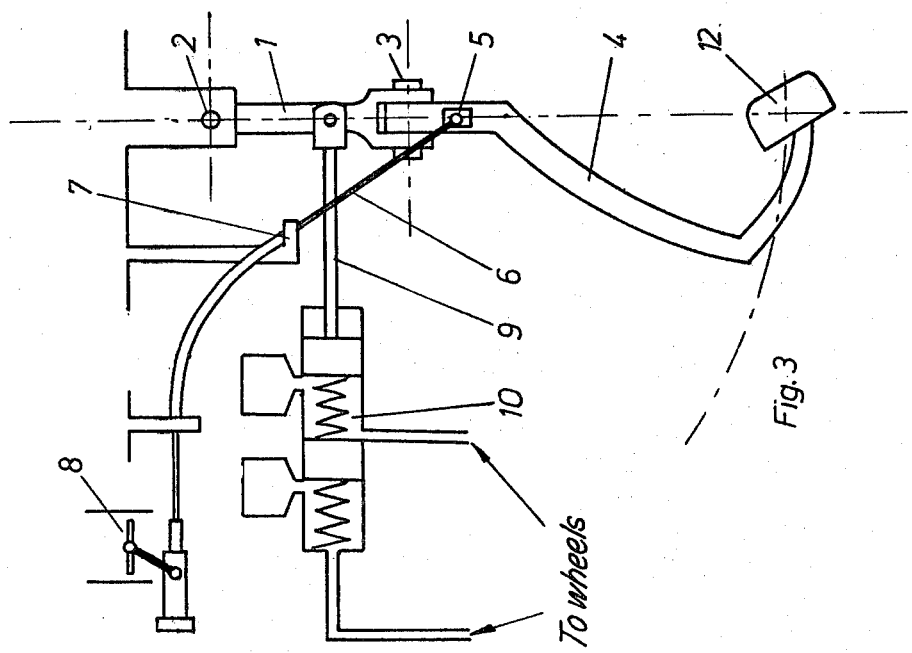
FIG. 3 is a side elevational view of the assembly of FIG. 1 showing the pedal in an unactivated position along with the main brake cylinder.

When the pedal assembly is operated, the driver's foot 21 is positioned with its heel on the vehicle floor 22 and the upper portion resting on the foot plate 12. The first arm portion is given an angular deflection by the muscle power in the driver's leg and assumes the position shown in FIG. 8. Due to the weight of the foot and the friction action between the foot sole and the rubber layer on the foot pedal, the first arm portion will be locked in the position shown, without necessitate any muscle power to keep the angular deflection. However, if the foot is lifted from the foot plate, or if the weight of the foot is relieved from the foot plate, the friction action will be eliminated and the foot pedal is forced against the idling position shown in FIGS. 2 and 3, by the action of a first arm portion return spring 23. This automatic reset of the throttle valve when the foot is lifted from the foot plate is very essential in view of the traffic safety. As shown in FIG. 8, a panel lamp is connected to indicate brake action.

When an increased fuel supply is desired, the foot is somewhat relieved from the foot plate in order to decrease the friction between the foot plate and the foot sole, whereupon the foot is pivoted to the right (or to the left for decreasing the fuel supply) by action of the foot against the side wall 24. When the desired fuel supply has been set, the foot is left resting against the vehicle floor 22 and the foot plate 19, the friction action between the foot sole and the foot plate rubber being sufficiently large to lock the linkage system consisting of the first arm portion, the foot plate and the driver's foot having the heel resting on the floor.

While the PEDAL ASSEMBLY FOR SIMULTANEOUSLY CONTROLLING THE BRAKE SYSTEM AND FUEL SUPPLY FOR A POWER DRIVEN VEHICLE IS shown and described in detail, it is obvious that this invention is not to be considered as being limited to the exact form disclosed, and that changes in detail and construction may be made therein within the scope of the invention, without departing from the spirit thereof.

What I claim is:

1. A pedal assembly for simultaneously and continuously controlling the brake system and the power supply system having fuel supply means for a power driven vehicle, said assembly comprising:
   (a) a single pedal having a first arm portion and a second arm portion;
   (b) the first arm portion being effective to move to various power supply working positions in a first plane of operation and the second arm portion being effective to move to various brake working positions in a second plane of operation normal to said first plane;
   (c) said second arm portion being connected to the brake system to effect braking while at a brake working position of said second arm portion in said second plane of operation;
   (d) blocking means being disposed adjacent the second arm portion and being effective to prevent unintentional operation of the second arm portion while located in a nonbraking position during operation of the first arm portion; and
   (e) Bowden cable means, having a first end, a second end, a casing and a wire movably disposed in said casing;
   (f) the first end being connected to said power supply means of the vehicle;
   (g) the second end being connected to the first arm portion to control said power supply means while at working position of said first arm portion in said first plane of operation;
   (h) said casing of said Bowden cable means at said second end being fixed to the vehicle frame a spaced distance below said first plane in the direction of braking;
   (i) said wire of said Bowden cable means at said second end being attached to the first arm portion, whereby braking action of said second arm portion is effective to automatically and continuously reduce the power supply without moving the first arm portion in said first plane of operation;
   (j) a movement of the first arm portion in its first plane of operation being effective to control the power supply means upon simultaneous braking of the vehicle.

2. An assembly as defined in claim 1 wherein
   said first arm portion includes a lever member projecting laterally outwards,
   said second end of the Bowden cable means being connected to said lever member.

3. An assembly as defined in claim 1 wherein
   the first arm portion is pivotally connected to said second arm portion which is pivotally connected to the frame structure of the vehicle.

4. An assembly as defined in claim 1 wherein
   said second arm portion includes a brake activating member adapted to activate the brake system when the second arm portion is in its brake working position.

5. An assembly as defined in claim 4 wherein
   a panel lamp is connected to light upon brake action of said second arm portion.

6. A pedal assembly for simultaneously and continuously controlling the brake system and the fuel supply system having a fuel supply means for a power driven vehicle, said assembly comprising:
   (a) a single pedal having a first arm portion and a second arm portion;
   (b) the first arm portion being effective to move to various working positions in a first plane of operation and the second arm portion being effective to move to various brake working positions in a second plane of operation normal to said first plane;
   (c) blocking means being disposed adjacent the second arm portion and being effective to prevent unintentional operation of the second arm portion while located in a nonbraking position during operation of the first arm portion;
   (d) Bowden cable means having a first end, a second end, a casing and a wire movably disposed in said casing;
   (e) the first end being connected to the fuel supply means of the vehicle;
   (f) the second end being connected to the first arm portion to control said fuel supply means while at a working position of said first arm portion in said first plane of operation;
   (g) said casing of said Bowden cable means at said second end being fixed to the vehicle frame a spaced distance below said first plane in the direction of braking;
   (h) said wire of said Bowden cable means at said second end being attached to the first arm portion, whereby braking of said second arm portion is effective to automatically and continuously reduce the fuel supply toward an engine idle position without moving the first arm portion in said first plane of operation;
   (i) return spring means being effective to bias the first arm portion toward the engine idle position; and
   (j) a foot plate attached to the end of the foot first arm portion whereby when the heel of the driver's foot is resting on the floor and there is angular deflection of said first arm portion, said first arm portion with the driver's foot is locked in its adjusted position by means of the friction engagement between the foot plate and the driver's foot sole against the biasing action of said return spring means.

7. An assembly as claimed in claim 6 wherein
   the foot plate is covered with rubber and has its right side bent upwardly to form a grip for holding the foot plate at the execution of various pedal operations.

* * * * *